(12) United States Patent
Liu

(10) Patent No.: US 6,954,568 B2
(45) Date of Patent: Oct. 11, 2005

(54) METHOD AND APPARATUS FOR SPLITTING OR COMBINING OPTICAL BEAMS WITH A Y COUPLER WITH REDUCED LOSS AND ELECTRICAL ISOLATION

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/426,704

(22) Filed: Apr. 29, 2003

(65) Prior Publication Data

US 2004/0218868 A1 Nov. 4, 2004

(51) Int. Cl.$^7$ ................................................ G02B 6/26
(52) U.S. Cl. .......................................... 385/45; 385/14
(58) Field of Search .............................. 385/14–16, 30, 385/39, 43, 45, 50, 129, 147

(56) References Cited

U.S. PATENT DOCUMENTS

| | | | | |
|---|---|---|---|---|
| 4,760,580 A | * | 7/1988 | Thompson et al. | 372/50 |
| 5,818,989 A | | 10/1998 | Nakamura | 385/45 |
| 5,923,801 A | * | 7/1999 | Frank et al. | 385/50 |
| 6,222,966 B1 | * | 4/2001 | Khan et al. | 385/45 |
| 6,470,104 B2 | | 10/2002 | Paniccia et al. | |
| 2004/0008944 A1 | * | 1/2004 | Johannessen et al. | 385/45 |
| 2004/0017975 A1 | * | 1/2004 | Zheng et al. | 385/43 |

FOREIGN PATENT DOCUMENTS

| | | | | |
|---|---|---|---|---|
| GB | WO 02/44772 | * | 6/2002 | G02B/6/12 |
| WO | WO 02/44772 | | 6/2002 | |
| WO | PCT/US2004/008422 | | 9/2004 | |

OTHER PUBLICATIONS

Treyz, G.V., "Silicon Mach–Zehnder Waveguide Interferometers Operating at 1.3μm," *Electronics Letters*, vol. 27, No. 2, Jan. 17, 1991, pp. 118–120.

Treyz, G.V., et al., "Silicon Mach–Zehnder Waveguide Interferometers Based on the Plasma Dispersion Effect," *Applied Physics Letters*, vol. 59, No. 7, Aug. 12, 1991, pp. 771–773.

Liu, Y.L. et al., "Silicon 1=2 Digital Optical Switch Using Plasma Dispersion," *Electronics Letters*, vol. 30, No. 2, Jan. 20, 1994, pp. 130–131.

(Continued)

*Primary Examiner*—Frank G. Font
*Assistant Examiner*—Christopher M. Kalivoda
(74) *Attorney, Agent, or Firm*—Blakely, Sokoloff, Taylor & Zafman LLP

(57) ABSTRACT

An apparatus and method for splitting and combining optical beams with reduced contact loss and electrical isolation. In one embodiment, an apparatus according to embodiments of the present invention includes a first optical waveguide section disposed in semiconductor material. The apparatus further includes second and third optical waveguide sections symmetrically disposed in the semiconductor material proximate to an end of the first optical waveguide section. First and second insulating gap regions are disposed in the semiconductor material between the first and second optical waveguide sections and the first and third optical waveguide sections, respectively, such that there is a first evanescent coupling between first and second optical waveguide sections across the first insulating gap region and there is a second evanescent coupling between the first and third optical waveguide sections across the second insulating gap region. The first, second, and third waveguide sections are electrically isolated.

27 Claims, 4 Drawing Sheets

OTHER PUBLICATIONS

Fischer, U. et al., "Integrated Optical Waveguide Switches in SOI," Proceedings 1995 IEEE International SOI Conference, Oct. 1995, pp. 141–142.

Tsutumi, K., et al., "Analysis of Single–Mode Optical Y–Junctions By the Bounded Step and Bend Approximation", *Journal of Lightwave Technology*, vol. 6, No. 4, (Apr. 1988), pp. 590–600.

Rangaraj, M., et al., "Low Loss Integrated Optical Y–Branch", *Journal of Lightwave Technology*, vol. 7, No. 5, (May 1989), pp. 753–758.

Shani, Y., et al., "Buried Rib Passive Waveguide Y Junctions with Sharp Vertex on InP", *IEEE Photonics Technology Letters*, vol. 3, No. 3, (Mar. 1991), pp. 210–212.

* cited by examiner

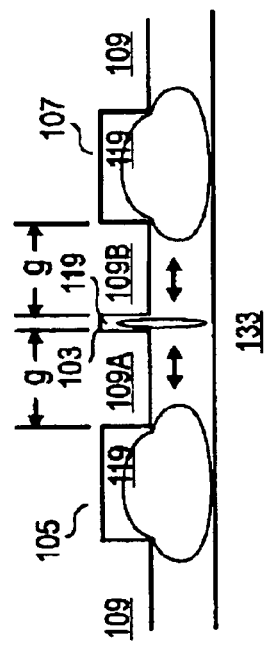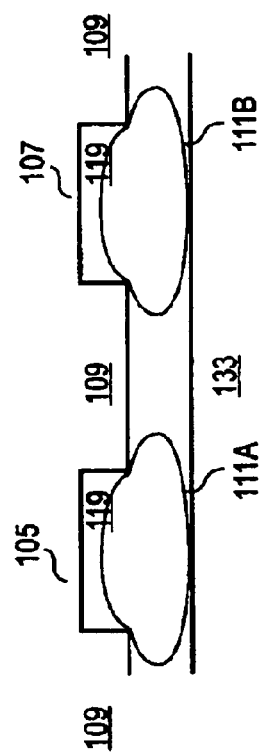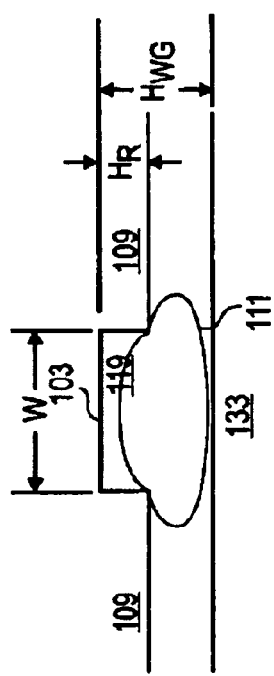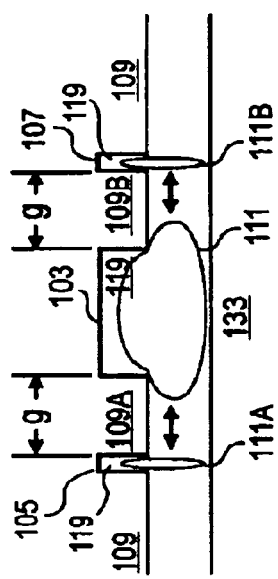

METHOD AND APPARATUS FOR SPLITTING OR COMBINING OPTICAL BEAMS WITH A Y COUPLER WITH REDUCED LOSS AND ELECTRICAL ISOLATION

BACKGROUND OF THE INVENTION

1. Field of the Invention

The present invention relates generally to optics and, more specifically, the present invention relates to splitting or combining optical beams.

2. Background Information

The components used in optical networks are often complex structures, individually fabricated for specific applications of use. Though complex overall, many of these components are formed of relatively simple individual optical devices combined to achieve complex functionality. Just as the advent of semiconductor logic gates facilitated the creation of the microprocessor, the development of simple optical devices performing functions such as coupling, splitting and combining allows system designers to form increasingly more complex optical circuits.

Of the various basic optical structures, signal splitting/combining is one of the most important. A single-mode optical waveguide 3-dB Y coupler or power divider is an important component that can be used in switches and modulators of for example the Mach-Zehnder interferometer (MZI) type. A conventional Y coupler is typically formed of a straight input waveguide for receiving an input signal and two output waveguides that meet at the input waveguide. Ideally, where the two output waveguides meet, a sharp vertex or inner edge is formed forming equal branching angles for the two output waveguides so as to equally split the input optical beam into two output optical beams.

In practice, however, known Y couplers often lose a sizeable amount of input energy due to limitations in device fabrication. For instance, fabricated Y couplers typically end up having a blunt vertex instead of a sharp vertex, which introduces radiation loss in the Y coupler. Radiation losses of 2–3 dB are not uncommon in known fabricated Y couplers of conventional design. In addition, an equal power splitting ratio cannot always be well controlled in conventional Y coupler designs. As can be appreciated, equal 50%—50% power splitting of a Y coupler is desired for the high extinction ratio for optical uses such as modulator and switch applications.

BRIEF DESCRIPTION OF THE DRAWINGS

The present invention is illustrated by way of example and not limitation in the accompanying figures.

FIGS. 2A through 2D are diagrams illustrating cross-section views at various locations of one embodiment of a Y coupler in accordance with the teachings of the present invention.

DETAILED DESCRIPTION

Methods and apparatuses for splitting and combining optical beams with a Y coupler are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based Y coupler is provided in a fully integrated solution on a single chip. One embodiment of the presently described Y coupler includes semiconductor-based optical waveguide sections defined in insulating material included in the semiconductor material. In one embodiment, each of the semiconductor-based optical waveguide sections is electrically isolated from each other by the insulating material in accordance with the teachings of the present invention. Thus, each of the semiconductor-based optical waveguide sections may be driven by electrical circuitry separate from the other semiconductor-based optical waveguide sections.

In addition, in one embodiment, an optical beam directed through a first one of the semiconductor-based optical waveguide sections is evanescently coupled to second and third semiconductor-based optical waveguide sections through first and second gap regions included in the insulating material with a 50%—50% split in power with little or no radiation loss. In addition, optical beams may propagate directionally in accordance with the teachings of the present invention. Therefore, an optical beam directed through the second semiconductor-based optical waveguide section is evanescently coupled to the first semiconductor-based optical waveguide section through the first gap region. An optical beam directed through the third semiconductor-based optical waveguide section is evanescently coupled to the first semiconductor-based optical waveguide section through the second gap region.

Figure 1:
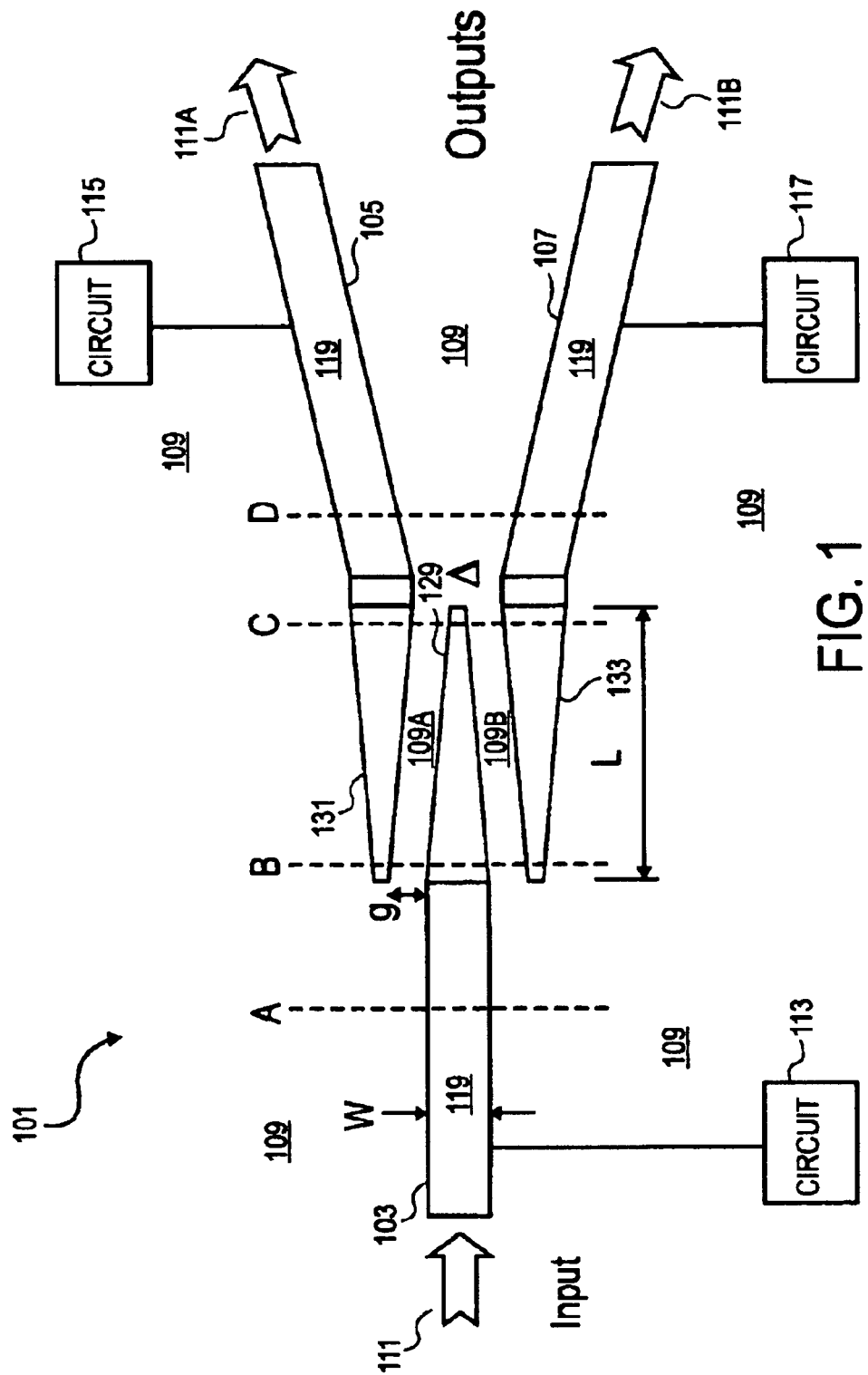
FIG. 1 is a top view diagram illustrating one embodiment of a Y coupler in accordance with the teachings of the present invention.

To illustrate, FIG. 1 is a top view diagram illustrating one embodiment of a Y coupler 101 in accordance with the teachings of the present invention. As shown, Y coupler 101 includes optical waveguide sections 103, 105 and 107 disposed in semiconductor material 119. Insulating material 109 is included in semiconductor material 119, which defines optical waveguide sections 103, 105 and 107. In one embodiment, semiconductor material 119 may be one of the silicon layers of a silicon-on-insulator (SOI) wafer and the SOI wafer may be etched and/or processed to include insulating material 109 to ultimately define optical waveguide sections 103, 105 and 107.

In FIG. 1, Y coupler 101 is illustrated with an optical beam 111 being directed as an input into optical waveguide section 103. In one embodiment, optical waveguide section 103 includes a linear taper region 129 at the end. As shown in FIG. 1, optical waveguide section 103 has a width of W and then tapers along linear taper region 129 to a width of Δ.

As optical beam 111 is directed through optical waveguide section 103 towards the linear taper region 129, optical beam 111 is split with an approximately 50%—50% power split into optical waveguide sections 105 and 107. In the illustrated embodiment, a portion of optical beam 111 is evanescently coupled into optical waveguide section 105 through an insulating gap region 109A, which is included in insulating material 109. Similarly, a portion of optical beam 111 is also evanescently coupled into optical waveguide section 107 through an insulating gap region 109B, which is also included in insulating material 109.

In one embodiment, insulating gap region 109A provides a gap distance g between optical waveguide section 103 and optical waveguide section 105 and insulating gap region 109B provides a gap distance g between optical waveguide section 103 and optical waveguide section 107. In one embodiment, gap distance g is sufficiently large enough to provide adequate electrical isolation between optical waveguide sections 103, 105 and 107, while at the same to enable evanescent coupling between optical waveguide sections 103 and 105 and optical waveguide sections 103 and 107.

As shown in the embodiment of FIG. 1, optical waveguide sections 105 and 107 are symmetrically disposed in semiconductor material 119 proximate to the linear taper region 129 on opposite sides of optical waveguide section 103. In one embodiment, optical waveguide section 105 also includes a linear tap region 131 proximate to insulating gap region 109A and optical waveguide section 107 includes a linear taper region 133 proximate to insulating gap region 109B. In one embodiment, similar to optical waveguide section 103, optical waveguide sections 105 and 107 each have a width of W and then taper along linear taper regions 131 and 133, respectively, to a width of Δ.

In one embodiment, each of the linear taper regions 129, 131 and 133 have a taper length L, which is chosen with gap distance g such that the input mode of optical beam 111 is gradually coupled evanescently from optical waveguide section 103 into optical waveguide sections 105 and 107 before reaching the end of linear taper region 129 of optical waveguide section 103. Therefore, optical beam 111 is split approximately 50%—50% between optical waveguide sections 105 and 107 with little or no radiation loss in accordance with the teaching of the present invention because all of optical beam 111 is evanescently coupled into optical waveguide sections 105 and 107 before reaching the end of linear taper region 129.

In one embodiment, each optical waveguide section 103, 105 and/or 107 may optionally be coupled to electrical circuitry and be driven by the electrical circuitry independent of the other optical waveguide sections. To illustrate, the embodiment in FIG. 1 illustrates that a circuit 113 may be coupled to optical waveguide section 103. In one embodiment, a circuit 115 may be coupled to optical waveguide section 105. In one embodiment, a circuit 117 may be coupled to optical waveguide section 107. It is appreciated that in various embodiments, all, some or none of circuits 113, 115 and 117 may be included. In accordance with the teachings of the present invention, circuit 113 is coupled to drive optical waveguide section 103 separate from optical waveguide sections 105 and/or 107, circuit 115 is coupled to drive optical waveguide section 105 separate from optical waveguide sections 103 and/or 107 and circuit 117 is coupled to drive optical waveguide section 107 separate from optical waveguide sections 103 and/or 105.

Possible uses for circuits 113, 115 and/or 117 include for example driving phase shifting structures, grating structures, or the like included in optical waveguide sections 103, 105 and/or 107. Phase shifting structures could be used in a variety of applications including optical delays, optical modulators, optical switches or the like.

It is appreciated that although optical beam 111 has been illustrated in FIG. 1 for explanation purposes as being directed as an input into optical waveguide section 103 and then output from optical waveguide sections 105 and 107, optical beam 111 may be directed in the opposite direction as well. That is, in one embodiment, Y coupler 101 may operate in a bi-directional manner such that Y coupler 101 functions as a splitter as well as a combiner in accordance with the teachings of the present invention.

FIGS. 2A through 2D are diagrams illustrating cross-section views at various locations of one embodiment of a Y coupler 101 in accordance with the teachings of the present invention. In particular, FIG. 2A shows a cross-section view of Y coupler 101 along dashed line A of FIG. 1. As shown in FIG. 1, dashed line A is through optical waveguide section 103 of Y coupler 101. As shown in FIG. 2A, optical waveguide section 103 is disposed in semiconductor material 119. In the illustrated embodiment, optical waveguide section 103 is a rib waveguide. It is appreciated that optical waveguide section 103 could be any other suitable type of optical waveguide such as for example a strip waveguide. If optical waveguide section 103 was a strip waveguide, the cross section would be rectangular in shape instead of the inverted "T" as shown in the rib waveguide embodiment of FIG. 2A.

In the embodiment shown in FIG. 2A, the rib portion of optical waveguide section 103 has a width of W and a height of $H_R$, while the height of the entire optical waveguide is $H_{WG}$. Regions of insulating material 109 are shown on opposite sides of the rib waveguide. In one embodiment, optical waveguide section 103 is fabricated on an SOI wafer and insulating material 133 is the buried oxide layer of the SOI wafer. In one embodiment, insulating material 109 and 133 include oxide and have a lower refractive indexes than the refractive index of the core of the optical waveguide section 103, which in one embodiment includes silicon. Therefore, the regions of insulating material 109 and 133 serve in one embodiment not only to electrically isolate optical waveguide section 103, but also to serve as cladding. To illustrate, FIG. 2A also shows optical beam 111 being directed through the optical waveguide. In the example shown in FIG. 2A, the optical path, and therefore optical beam 111, are shown to propagate along a direction going through, or coming in and out of, the page. As shown, insulating material 109 and 133 act as cladding to help to confine optical beam 111 to remain within the optical waveguide.

FIG. 2B shows a cross-section view of Y coupler 101 along dashed line B of FIG. 1. As shown in FIG. 1, dashed line B is through narrower portions linear taper portions 131 and 133 and through a wider portion of linear taper portion 129. As shown in FIG. 2B, optical waveguide sections 103, 105 and 107 are disposed in semiconductor material 119. Optical waveguide section 105 is disposed a gap distance g across insulating gap region 109A from optical waveguide section 103. Optical waveguide section 107 is disposed a gap distance g across insulating gap region 109B from optical waveguide section 103. FIG. 2B shows the evanescent coupling between optical waveguide sections 103 and 105 and optical waveguide sections 103 and 107 with portions of optical beam 111 beginning to be gradually split into optical beams 111A and 111B from optical waveguide section 103 into optical waveguide sections 105 and 107, respectively.

FIG. 2C shows a cross-section view of Y coupler 101 along dashed line C of FIG. 1. As shown in FIG. 1, dashed line C is through wider portions linear taper portions 131 and 133 and through a narrower portion of linear taper portion 129. As shown in FIG. 2C, optical waveguide sections 103, 105 and 107 are disposed in semiconductor material 119. Optical waveguide section 105 is disposed a gap distance g across insulating gap region 109A from optical waveguide section 103. Optical waveguide section 107 is disposed a gap distance g across insulating gap region 109B from optical waveguide section 103. FIG. 2C shows the evanescent coupling between optical waveguide sections 103 and 105 and optical waveguide sections 103 and 107 with nearly all of optical beam 111 has been gradually split along linear taper region 129 into optical beams 111A and 111B in optical waveguide sections 105 and 107, respectively, prior to reaching the end of linear taper region 129 of optical waveguide section 103.

FIG. 2D shows a cross-section view of Y coupler 101 along dashed line D of FIG. 1. As shown in FIG. 1, dashed line D is through optical waveguide sections 105 and 107 of Y coupler 101. As shown in FIG. 2D, optical waveguide sections 105 and 107 are disposed in semiconductor material 119 and are separated by insulating material 109. Optical beam 111A is confined to remain in optical waveguide section 105 and optical beam 111B is confined to remain in optical waveguide section 107 with cladding provided by insulating material 109 and 133. Indeed, FIG. 2D shows that there is no longer any evanescent coupling between optical waveguide sections 105 and 107 in this portion of Y coupler 101 along dashed line D.

Figure 3:
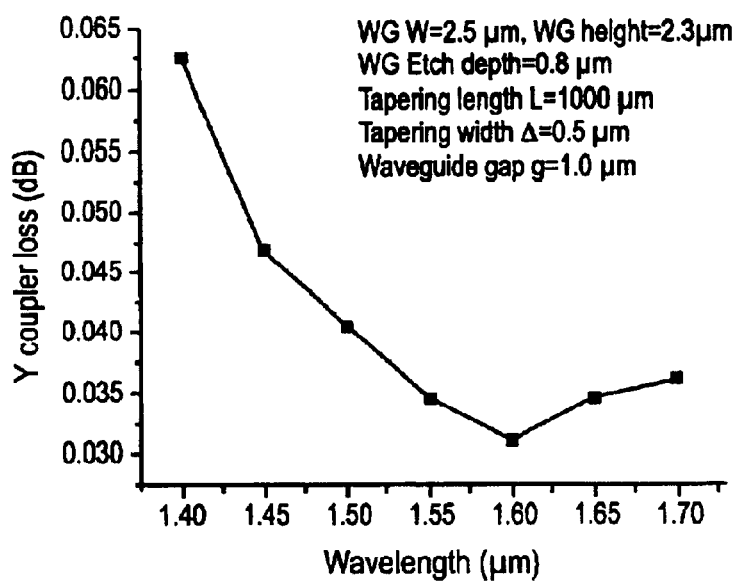
FIG. 3 is a plot illustrating a relationship between Y coupler loss and the wavelength of an optical beam according to one embodiment of a Y coupler in accordance with the teachings of the present invention.

FIG. 3 is a plot 301 illustrating a relationship between Y coupler loss and the wavelength of an optical beam according to one embodiment of a Y coupler in accordance with the teachings of the present invention. Referring briefly back to FIGS. 1 and 2A, the Y coupler embodiment illustrated in FIG. 3 is a rib waveguide with a waveguide width W equal to approximately 2.5 $\mu$m, a waveguide height $H_{WG}$ equal to approximately 2.3 $\mu$m, a waveguide rib portion height $H_R$ equal to approximately 0.8 $\mu$m, a taper length L equal to approximately 1000 $\mu$m, a taper width $\Delta$ equal to approximately 0.5 $\mu$m and a gap distance g equal to approximately 1.0 $\mu$m.

In the embodiment illustrated in FIG. 3, plot 301 shows that there is only a Y coupler loss of approximately 0.062 dB for a wavelength of optical beam 111 equal to approximately 1.40 $\mu$m and the Y coupler loss decreases down to approximately 0.030 dB at a wavelength of approximately 1.60 $\mu$m for optical beam 111. The Y coupler loss increases only up to approximately 0.035 dB at a wavelength of 1.70 $\mu$m for optical beam 111. Indeed, plot 301 shows that the Y coupler loss is very small for a large wavelength range of optical beam 111.

It is appreciated that since the embodiment of Y coupler 101 illustrated above does not need to have a "sharp" vertex, since taper width $\Delta$ is relatively "blunt" with a width approximately 0.5 $\mu$m, Y coupler 101 can be fabricated and processed by use of only one mask. It is appreciated that for defining "sharp" vertexes in Y couplers, multiple masks are often necessary, which increases processing complexity and the difficulty in achieving 50%—50% power splitting of the Y coupler.

Figure 4:
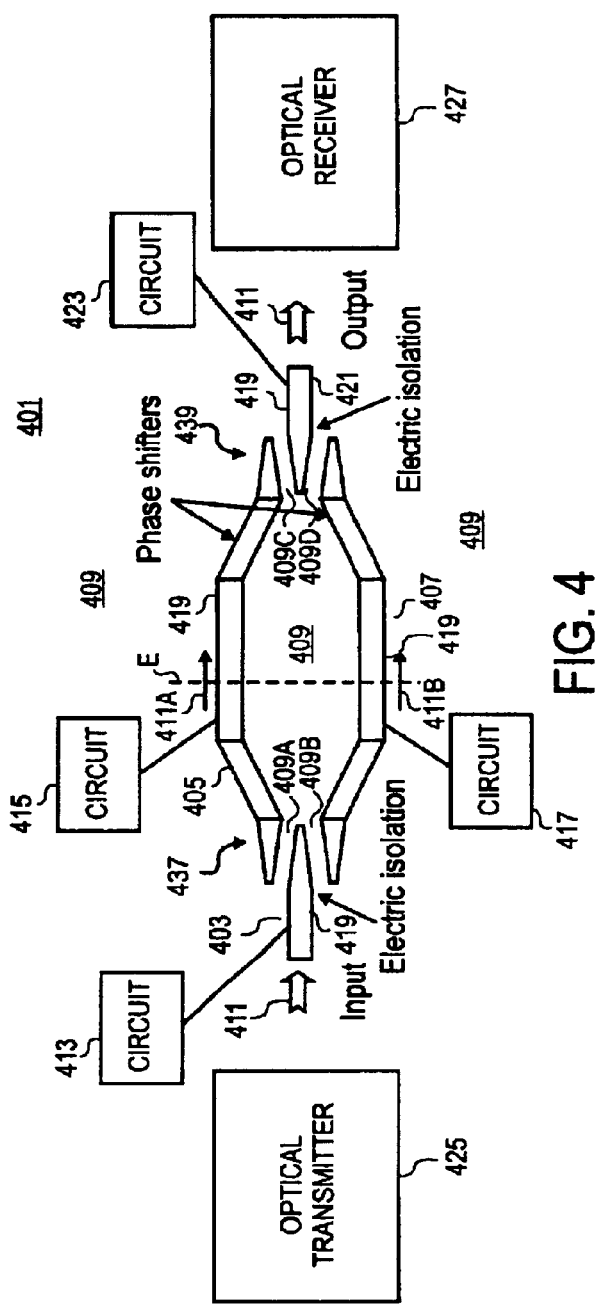
FIG. 4 is block diagram illustrating an optical system having embodiments of Y couplers included in an MZI configuration in accordance with the teachings of the present invention.

FIG. 4 is block diagram illustrating an optical system 401 having embodiments of Y couplers 437 and 439 included in a Mach Zehnder interferometer (MZI) configuration in accordance with the teachings of the present invention. As shown in the depicted embodiment, optical system 401 includes an optical transmitter 425, which generates an optical beam 411. Optical beam 411 is directed into optical waveguide section 403 of Y coupler 437. Optical beam 411 is then split into optical beams 411A and 411B, which are directed through optical waveguide sections 405 and 407, respectively. In the illustrated embodiment, optical waveguide sections 405 and 407 are the separate arms of the MZI configuration. Split optical beams 411A and 411B are then combined by Y coupler 439 and then output from optical waveguide section 421 of Y coupler 439 into optical receiver 427.

In the illustrated embodiment, both Y couplers 437 and 439 share similarities with the Y couplers described previously in connection with previously described FIGS. 1–3. For instance Y coupler 437 includes optical waveguide sections 403, 405 and 407 disposed in semiconductor material 419 and defined with insulating material 409. Y coupler 439 includes optical waveguide sections 421, 405 and 407 disposed in semiconductor material 419 and defined with insulating material 409. Optical waveguide section 403 is evanescently coupled to optical waveguide section 405 across insulating gap region 409A. Optical waveguide section 403 is also evanescently coupled to optical waveguide section 407 across insulating gap region 409B. Optical waveguide section 421 is evanescently coupled to optical waveguide section 405 across insulating gap region 409C. Optical waveguide section 421 is also evanescently coupled to optical waveguide section 407 across insulating gap region 409D. In addition, optical waveguide sections 403, 405, 407 and 421 are all electrically isolated from each other.

In one embodiment, each optical waveguide section 403, 405, 407 and/or 421 may optionally be coupled to electrical circuitry and may optionally be driven by the electrical circuitry independent of the other optical waveguide sections. To illustrate, the embodiment in FIG. 4 illustrates that a circuit 413 may be coupled to optical waveguide section 403. In one embodiment, a circuit 415 may be coupled to optical waveguide section 405. In one embodiment, a circuit 417 may be coupled to optical waveguide section 407. In one embodiment, a circuit 423 may be coupled to optical waveguide section 421. It is appreciated that in various embodiments, all, some or none of circuits 413, 415, 417 and 423 may be included. In accordance with the teachings of the present invention, circuit 413 is coupled to drive optical waveguide section 403 separate from optical waveguide sections 405, 407 and/or 421, circuit 415 is coupled to drive optical waveguide section 405 separate from optical waveguide sections 403, 407 and/or 421, circuit 417 is coupled to drive optical waveguide section 407 separate from optical waveguide sections 403, 405 and/or 421 and circuit 423 is coupled to drive optical waveguide section 421 separate from optical waveguide sections 403, 405 and/or 405. Possible uses for driving optical waveguide sections 403, 405, 407 and/or 421 may include for example driving optical delay or phase shifting applications or the like.

In one embodiment, circuits 415 and 417 are included to drive optical waveguide sections 405 and 407, respectively, to control a relative phase difference between optical beams 411A and 411B, which are directed through optical waveguide sections 405 and 407, respectively. In one embodiment, it is appreciated that optical waveguide sections 405 and 407 include phase shifter structures that are driven independently in response to circuits 415 and 417, respectively. By controlling the relative phase difference between optical beams 411A and 411B, optical beam 411 may be modulated in response to the relative phase difference between the optical beams as a result of constructive or destructive interference occurring in Y coupler 437 when optical beams 411A and 411B are combined.

Figure 5:
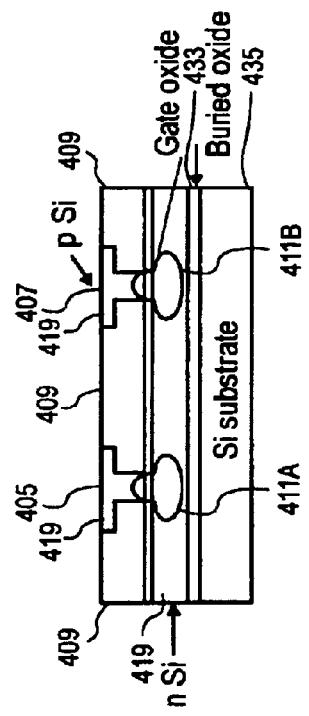
FIG. 5 is a diagram illustrating a cross-section view of one embodiment of an MZI configuration having embodiments of Y couplers in accordance with the teachings of the present invention.

FIG. 5 is a diagram illustrating a cross-section view of one embodiment of the optical system 401 illustrated in FIG. 4 through the MZI configuration. As shown in FIG. 4, dashed line E is through optical waveguide sections 405 and 407. As shown in FIG. 5, optical waveguide sections 405 and 407 are disposed in semiconductor material 419 and are defined with insulating material 409. In the illustrated embodiment, optical waveguide sections 405 and 407 are rib waveguides and include complementary metal oxide semiconductor (CMOS) capacitor structure adapted to phase shift optical beams in response to signals received from coupled circuitry. In one embodiment, the CMOS capacitor structures adapted to modulate charge modulated regions in optical waveguide sections 405 and 407 though which optical beams 411A and 411B are directed.

For instance, FIG. 5 shows that optical beam 411A is directed through optical waveguide section 405 and that optical beam 411B is directed through optical waveguide section 407. In the illustrated embodiment, optical waveguide sections 405 and 407 are fabricated on an SOI wafer, which includes a buried oxide layer 433 disposed between semiconductor material 419 and semiconductor material 435. In one embodiment, semiconductor material 419 and 435 include silicon. In the illustrated embodiment, the rib portions of optical waveguide sections 405 and 407 include p type doped silicon and the slab portions of optical waveguide sections 405 and 407 include n type doped silicon.

As shown in the embodiment of FIG. 5, the p and n type doped regions of semiconductor material are separated by a gate oxide layer, which is included in insulating material 409. In one embodiment, the p and n type doped regions are electrically coupled to and are driven by circuits 415 and 417. For instance, in one embodiment, the p type doped region of optical waveguide section 405 is electrically coupled to circuit 415 and the p type doped region of optical waveguide section 407 is electrically coupled to circuit 417. In one embodiment, the n type doped region of optical waveguide sections 405 and 407 are electrically coupled to common ground. With the different polarities of semiconductor material 419, charge modulated regions may be modulated on the opposite sides of the gate oxide layer to form separate phase shifting structures in optical waveguide sections 405 and 407 in response to signals received from circuits 415 and 417.

In operation, optical beams 411A and 411B are directed through the charge modulated regions that are modulated on the opposite sides of the gate oxide layer in optical waveguide sections 405 and 407. As a result, the relative phase difference between optical beams 411A and 411B is controlled as a result of the plasma optical effect. The relative phase difference between optical beams 411A and 411B may then be used to control constructive and destructive interference that occurs when combining optical beams 411A and 411B at Y coupler 439 in FIG. 4.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:

a first optical waveguide section disposed in semiconductor material;

second and third optical waveguide sections symmetrically disposed in the semiconductor material proximate to an end of the first optical waveguide section;

first and second insulating gap regions disposed in the semiconductor material between the first and second optical waveguide sections and the first an third optical waveguide sections, respectively, such that there is a first evanescent coupling between first and second optical waveguide sections across the first insulating gap region and there is a second evanescent coupling between the first and third optical waveguide sections across the second insulating gap region; and an electrical circuit coupled to the first optical waveguide section, the electrical circuit coupled to drive the first optical waveguide section independent from the other waveguide sections to induce at least one of an optical delay and a phase shift into the first optical waveguide section.

2. The apparatus of claim 1 wherein the first and second insulating gap regions are included in insulating material disposed in the semiconductor material, the insulating material disposed along sides of the first, second and third optical waveguide sections to electrically isolate at least portions of the first, second and third waveguide sections from each other.

3. The apparatus of claim 2 further comprising a second electrical circuit coupled to electrically drive the second optical waveguide section separate from the first or third optical waveguide sections.

4. The apparatus of claim 3 further comprising a third electrical circuit coupled to electrically drive the third optical waveguide section separate from the first or second optical waveguide sections.

5. The apparatus of claim 1 wherein the first and second insulating gap regions are included in insulating material disposed in the semiconductor material, the insulating material disposed along sides of the first, second and third optical waveguide sections to serve as cladding for the first, second and third optical waveguide sections.

6. The apparatus of claim 1 wherein the first and second insulating gap regions each have a gap width to separate the first optical waveguide section from the second and third optical waveguide sections by the gap width.

7. The apparatus of claim 1 wherein the end of the first optical waveguide section includes a linear taper region having a taper length proximate to the first and second insulating gap regions.

8. The apparatus of claim 7 wherein the second and third optical waveguide sections each include a linear taper region having the taper length proximate to the first and second insulating gap regions.

9. The apparatus of claim 1 wherein an optical beam directed through the first optical waveguide section toward the end of the first optical waveguide section is split substantially equally into the second and third optical waveguide sections across the first and second insulating gap regions.

10. The apparatus of claim 1 wherein first and second optical beams directed through the second and third optical waveguide sections toward the end of the first optical waveguide section are combined into the first optical waveguide section.

11. The apparatus of claim 1 wherein the first, second and third optical waveguide sections each comprise rib waveguides.

12. The apparatus of claim 1 wherein the first, second and third optical waveguide sections each comprise strip waveguides.

13. A method, comprising:
directing a first optical beam through a first optical waveguide section disposed in semiconductor material;
evanescently coupling a first portion of the first optical beam to a second optical waveguide section disposed in the semiconductor material proximate to an end of the first optical waveguide section;
evanescently coupling a second portion of the first optical beam to a third optical waveguide section disposed in the semiconductor material proximate to the end of the first optical waveguide section such that the first optical beam is split substantially equally into the first and second portions of the first optical beam directed through the second and third optical waveguide sections, respectively; and
electrically driving a first capacitor structure including p and n type doped regions in the semiconductor material separated by an oxide layer, the first capacitor structure formed within one of the first, second or third optical waveguide sections.

14. The method of claim 13 further comprising:
directing a second optical beam through the second optical waveguide section
evanescently coupling the second optical beam into the first optical waveguide section;
directing a third optical beam through the third optical waveguide section
evanescently coupling the third optical beam into the first optical waveguide section; and
combining the second and third optical beams in the first optical waveguide section.

15. The method of claim 13 further comprising electrically isolating at least portions of the first, second and third optical waveguide sections from each other with insulating material disposed in the semiconductor material around the first, second and third optical waveguide sections.

16. The method of claim 13, further comprising electrically driving a second capacitor structure including p and n type doped regions in the semiconductor material separated by an oxide layer, the second capacitor structure formed within a different one of the first, second or third optical waveguide sections.

17. The method of claim 16 wherein electrically driving the second capacitor structure comprises electrically driving the second capacitor structure independently of electrically driving the first capacitor structure.

18. A system, comprising:
an optical transmitter to generate an optical beam;
an optical receiver optically coupled to receive the optical beam;
an optical device optically coupled between the optical transmitter and the optical receiver, the optical device including:
an input optical waveguide section disposed in semiconductor material;
an output optical waveguide section disposed in the semiconductor material;
first and second arm optical waveguide sections disposed in the semiconductor material between the input and output optical waveguide sections;
first and second insulating gap regions disposed in the semiconductor material between the input and first arm optical waveguide sections and the input and second arm optical waveguide sections, respectively, such that there is a first evanescent coupling between input and first arm optical waveguide sections across the first insulating gap region and there is a second evanescent coupling between the input and second arm optical waveguide sections across the second insulating gap region;
third and fourth insulating gap regions disposed in the semiconductor material between the respective first and second arm optical waveguide sections and the output optical waveguide section such that there is a third evanescent coupling between first arm and the output optical waveguide section across the third insulating gap region and there is a fourth evanescent coupling between the second arm and the output optical waveguide section across the fourth insulating gap region; and
a capacitor structure including p and n type doped regions in the semiconductor material separated by an oxide layer, the second capacitor structure disposed within, and the oxide layer passing through, at least one of the input optical waveguide section, the output optical waveguide section, the first arm optical waveguide section, and the second arm optical waveguide section.

19. The system of claim 18 wherein the first, second, third and fourth insulating gap regions are included in insulating material disposed in the semiconductor material, the insulating material disposed along sides of the input, the output, and the first and second arm optical waveguide sections to electrically isolate at least portions of the input, the output, and the first and second arm optical waveguide sections from each other.

20. The system of claim 18 further comprising an electrical circuit coupled to electrically drive the input optical waveguide section separate from the first arm, the second arm or the output optical waveguide sections.

21. The system of claim 18 further comprising an electrical circuit coupled to electrically drive the output optical waveguide section separate from the first arm, the second arm or the input optical waveguide sections.

22. The system of claim 18 further comprising an electrical circuit coupled to electrically drive the first arm optical waveguide section separate from the input, the second arm, or the output optical waveguide sections.

23. The system of claim 18 further comprising an electrical circuit coupled to electrically drive the second arm optical waveguide section separate from the input, the first arm, or the output optical waveguide sections.

24. The system of claim 18 wherein an end of the input optical waveguide section includes a linear taper region having a taper length proximate to the first and second insulating gap regions.

25. The system of claim 24 wherein the first and second arm optical waveguide sections each include a linear taper region having the taper length proximate to the first and second insulating gap regions.

26. The system of claim 18 wherein an end of the output optical waveguide section includes a linear taper region having a taper length proximate to the third and fourth insulating gap regions.

27. The system of claim 26 wherein the first and second arm optical waveguide sections each include a linear taper region having the taper length proximate to the third and fourth insulating gap regions.

* * * * *